E. J. MOORE.
MACHINE FOR CUTTING AND SETTING SAW TEETH.
APPLICATION FILED JAN. 4, 1911.

1,004,456.

Patented Sept. 26, 1911.

Witnesses
Fenton S. Belt
V. B. Hillyard.

Inventor
Ebenezer J. Moore
By Victor J. Evans
Attorney

E. J. MOORE.
MACHINE FOR CUTTING AND SETTING SAW TEETH.
APPLICATION FILED JAN. 4, 1911.

1,004,456.

Patented Sept. 26, 1911.

3 SHEETS—SHEET 3.

Witnesses
Fenton S. Belt
U. B. Hillyard.

Inventor
Ebenezer J. Moore

By Victor J. Evans
Attorney

UNITED STATES PATENT OFFICE.

EBENEZER J. MOORE, OF PORTLAND, MAINE.

MACHINE FOR CUTTING AND SETTING SAW-TEETH.

1,004,456.  Specification of Letters Patent.  Patented Sept. 26, 1911.

Application filed January 4, 1911.  Serial No. 600,754.

*To all whom it may concern:*

Be it known that I, EBENEZER J. MOORE, a citizen of the United States, residing at Portland, in the county of Cumberland and State of Maine, have invented new and useful Improvements in Machines for Cutting and Setting Saw-Teeth, of which the following is a specification.

The present invention provides a machine which may be utilized for forming teeth upon blades or disks in the construction of straight or circular saws or for setting saw teeth, the machine being substantial in structure and involving a comparatively simple arrangement of parts and embodying a novel arrangement and combination of elements admitting of the work being rapidly and effectively formed.

The invention consists of the novel features, details of construction and combination of parts, which hereinafter will be more particularly set forth, illustrated in the accompanying drawings, and pointed out in the appended claims.

Figure 1:
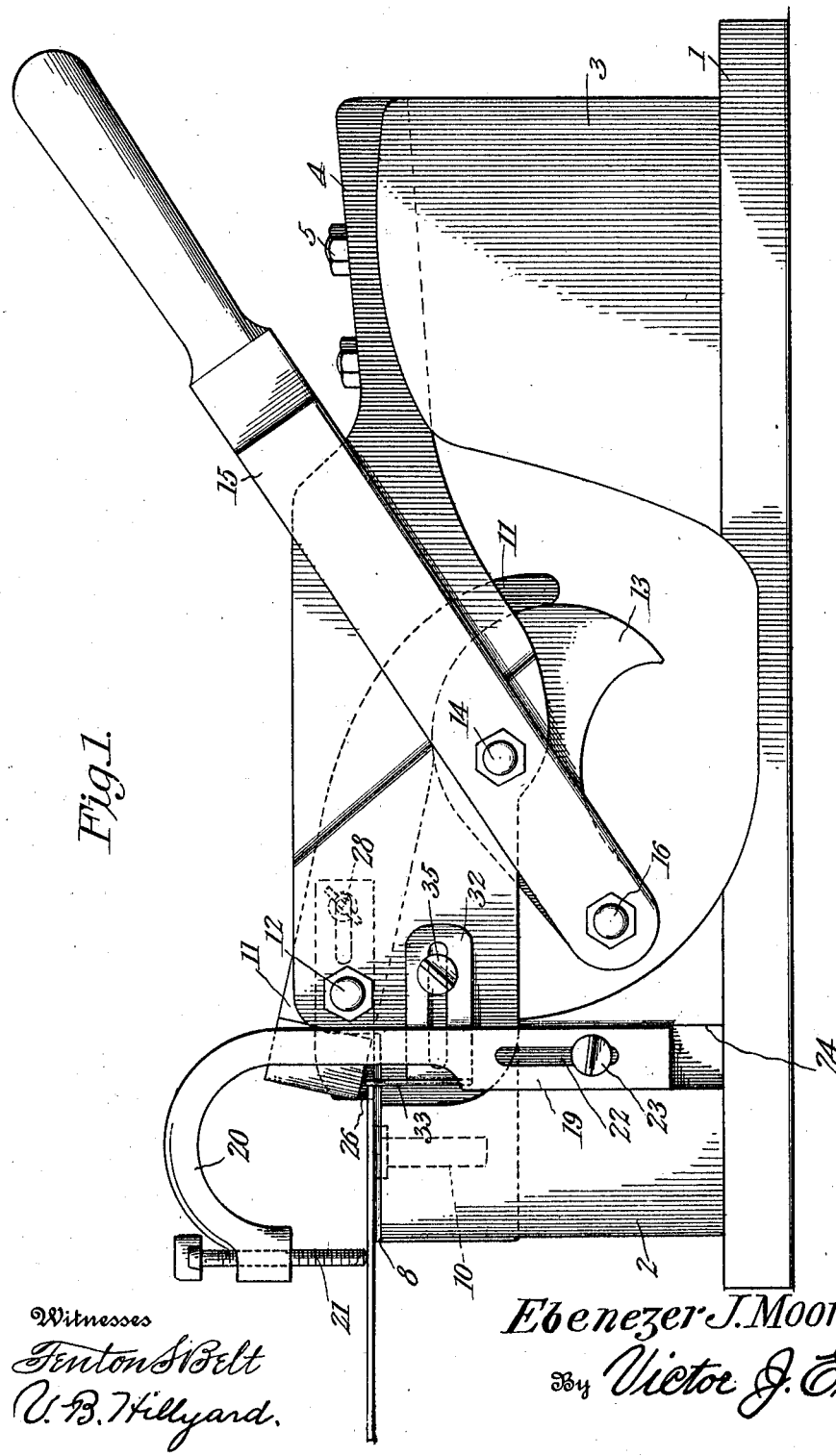
Figure 2:
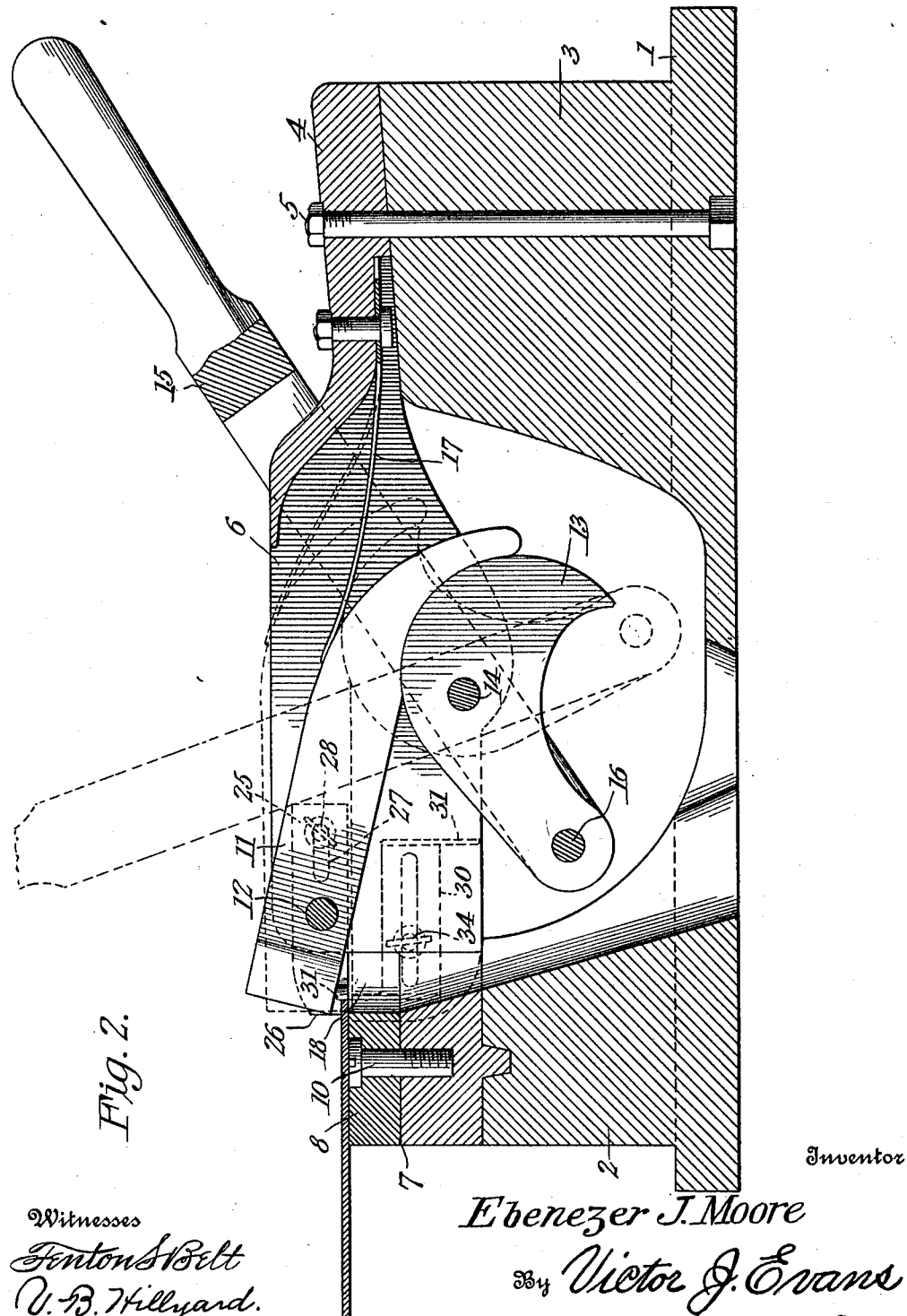
Figure 3:
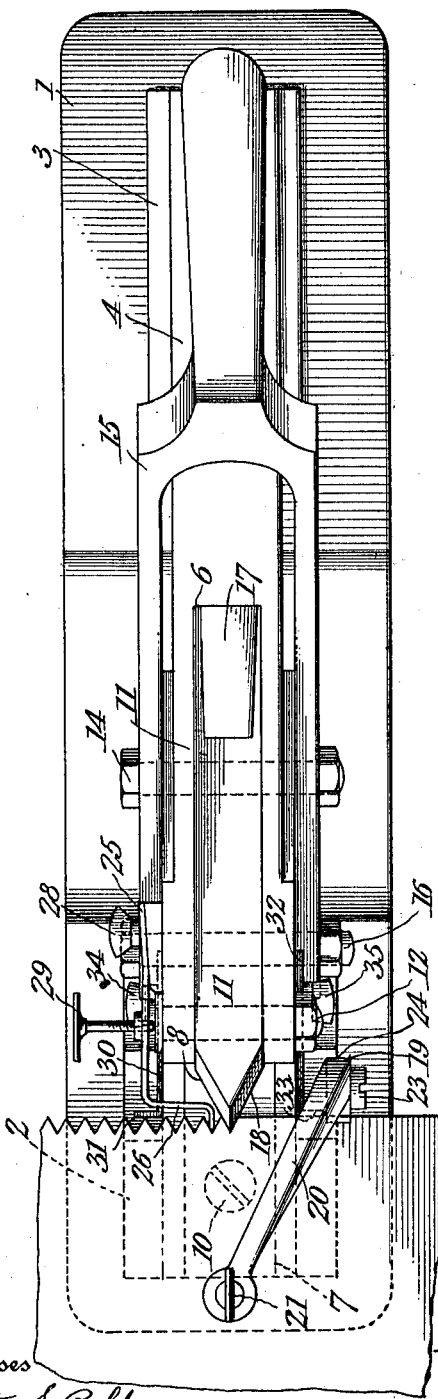
Figure 4:
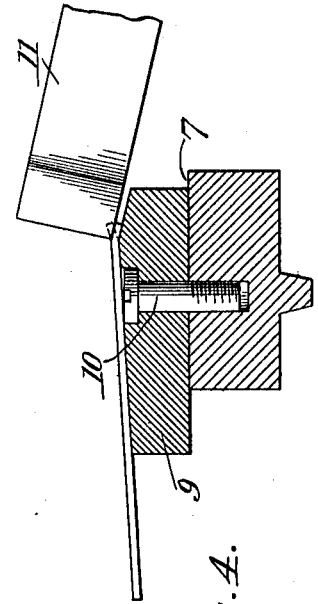

Referring to the drawings, forming a part of the application, Figure 1 is a side view of a machine embodying the invention. Fig. 2 is a vertical central longitudinal section thereof, showing the pivoted arm and cam in full lines. Fig. 3 is a top plan view of the machine. Fig. 4 is a detail view of the machine, showing the manner of setting the teeth of saws.

Corresponding and like parts are referred to in the following description, and indicated in all the views of the drawings, by the same reference characters.

The machine embodies a stand, a frame mounted thereon, a pivoted arm having a working end, a die or an anvil adapted to coöperate with the working end of the pivoted arm, an operating lever for actuating the pivoted arm, a work holder and gages, the several parts being arranged substantially as set forth hereinafter.

The stand is formed of a base 1 and uprights 2 and 3 rise from opposite ends of the base and are recessed in their upper ends to receive the frame 4. The frame consists essentially of a bar located above the base 1 and seated at its ends in the recessed ends of the uprights 2 and 3 and held thereto preferably by means of bolts 5 which connect the rear end of the frame to the rear upright 3. The frame or bar 4 has a longitudinal slot 6 which extends vertically, said slot terminating a distance from the ends of the frame. A recess 7 is formed in the upper side of the front portion of the frame or bar 4 and provided with a seat to receive either a die 8 or an anvil 9, according to the specific use for which the machine is adapted. When the machine is designed for cutting saw teeth the die 8 is fitted in the recess 7, but when the machine is intended for setting saw teeth an anvil 9 is placed in the recess 7. A bolt or fastening 10 is adapted to secure either the die or the anvil when placed in the recess 7. An arm 11 is located in the slot 6 and is pivoted therein at 12, the pivot fastening extending through openings formed transversely in the separated parts of the frame or bar 4 bordering upon the slot 6. The working end of the pivoted arm 11 has opposite sides forwardly converged to give a taper corresponding to the shape of the teeth to be cut or set. The rear end of the pivoted arm curves downwardly and a cam 13 engages the under side thereof, said cam being arranged to operate in the longitudinal slot 6. A bolt or pin 14 pivotally supports the cam 13 and is supported in the frame or bar 4. An operating lever 15 has its lower portion forked, the fork members embracing opposite sides of the frame 4 and pivotally connected thereto by means of the bolt or pin 14, the fork members extending below said frame and being connected by means of a bolt or fastening 16, which likewise passes through the lower end of the cam 13 and serves to connect the parts. A spring 17 is secured at one end to the frame 4 and its opposite end exerts a downward pressure on the pivoted arm, thereby holding the same in engagement with the cam 13 and the forward end elevated. Upon moving the upper end of the operating lever 15 forward the rear end of the pivoted arm 11 is elevated and the working end thereof depressed. The die 8 consists of a block of steel having a recess 18 in its inner end conforming to the shape of the tooth to be cut and to the shape of the working end of the pivoted arm 11. When the parts are assembled the working end of the pivoted arm normally stands above the top side of the die 8 a distance to admit of a blade being introduced between the die and working end of the pivoted arm, so that upon elevating the rear end of the pivoted arm the working end thereof will be depressed and cut a portion from the blade. When the machine is adapted for cutting saw teeth the die 8 is placed in position, but when arranged for setting the teeth of saws the die 8 is replaced by the anvil 9, the inner end of which is beveled according to the required set to be given to the teeth of the saw. The work, that is the saw or the blade, is supported upon the front upright 2 and the forward portion of the frame 4 and rests upon the die or the anvil. A work holder is provided for holding the saw or the blade in proper position and suitable gages are employed to properly position the work.

The work holder consists of a standard 19, arm 20 and set screw 21. The work holder is vertically adjustable and its standard 19 has a slot 22 through which a set screw or suitable fastening 23 passes to adjustably hold the standard to the front upright 2. A vertical recess 24 is formed in a side of the upright 2 and receives the standard 19 so as to prevent lateral movement of the standard or a turning thereof on the fastening 23. The arm 20 of the work holder overhangs the front upright 2 and the forward end of the frame 4 and terminates in a head in which a vertical opening is formed, said opening being threaded to receive the set screw 21. The work holder may be adjusted to bring the outer end of the arm 20 the required distance from the upright 2 so that the set screw 21 may be operated to effect the desired result. The set screw 21 may pass through the opening formed centrally in a disk so that teeth may be cut thereon in the formation of a circular saw, or said set screw may pass through the opening of a circular saw to position the same when setting the teeth thereof, or a plate or saw blade may be held on the upright 2 against vertical movement by properly adjusting the set screw 21 to touch the blade.

A spacing gage is located at one side of the frame 4 and is adjustable longitudinally and laterally. The spacing gage is preferably formed of a strip of spring metal comprising a shank 25 and an offset end 26, the latter extending in front of the frame and arranged at one side of the working end of the pivoted arm 11. The shank of the spacing gage has a slot 27 through which a set screw or fastening 28 passes to hold the spacing gage in the adjusted position when moved to have its offset end 26 project to a greater or less distance beyond the forward end of the frame 4. A set screw 29 is threaded into a block secured to a side of the shank 25 and its inner end engages a side of the frame and by turning the set screw the front portion of the spacing gage is moved laterally to a greater or less extent according to the distance between the teeth to be cut upon a blade or disk. The set screw 29 deflects the forward portion of the spacing gage to throw the offset end 26 thereof away from the working end of the pivoted arm 11 to the required distance. The forward adjustment of the spacing gage regulates the depth of the teeth and the lateral adjustment of the spacing gage determines the width or distance between the teeth.

Alining gages are located at the sides of the frame 4 to properly position the work so that the teeth may be cut regularly or the set of saw teeth be uniform. The alining gages limit the forward movement of a blade and insure the front edge thereof coming to a given line. One of the alining gages comprises a slotted plate 30 and bent ends 31, said bent ends having terminal portions projecting from opposite edges of the plate 30, thereby providing in effect a double gage which admits of either end being placed foremost. The other gage comprises a slotted plate 32 having a bent end 33. Set screws 34 and 35 pass through the slots of the respective plates 30 and 32 and secure the same to the frame 4 in the adjusted position. The projecting ends of the alining gages may be extended upwardly or forwardly to the required distance and when the gages are set their position is fixed by means of the fastenings 34 and 35.

The anvil 9 consists of a block, the inner end of which is beveled according to the set to be given the saw teeth. The anvil when fitted in the recess 7 is secured in place by means of the bolt or fastening 10. In the operation of the machine for setting the teeth of saws the blade is placed upon the front upright 2 and forward portion of the frame 4 and rests upon the outer part of the anvil 9, the tooth to be set overhanging the inner beveled part of the anvil. Upon operating the lever 15 the working end of the pivoted arm 11 is lowered and bends the teeth to the angle of the beveled or inclined end of the anvil 9.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a machine of the character described, the combination of a frame, an arm pivoted to the frame and having a working end, a cam pivoted to the frame and adapted to engage the pivoted arm to effect operation thereof, an operating lever having a portion forked to embrace opposite sides of the frame and cam, a pivot fastening connecting the fork members of the operating lever to the frame and passing through the cam and pivotally supporting the same, and a second fastening passing through the fork members of the operating lever and through the cam and connecting the same.

2. In a machine of the character described, the combination of a frame having a longitudinal slot, an arm arranged within the slot of the frame and pivotally supported therein and having a working end, a cam arranged to operate in the slot and to engage the pivoted arm for operating the same, a forked lever having its fork members embracing opposite sides of the frame and cam, a fastening pivotally connecting the fork members of the lever and the cam to the frame and passing through registering openings therein, and a second fastening connecting the fork members and the cam a distance from the pivot fastening.

3. A machine comprising a stand formed of a base and uprights at the ends of the base, a frame supported upon the uprights and having its intermediate portion longitudinally slotted, an arm pivotally supported within the slot of the frame, a cam arranged to operate in the slot of the frame and to engage the said pivoted arm, an operating lever having a forked portion embracing opposite sides of the frame and cam, a fastening pivotally connecting the fork members and cam to the frame, and a second fastening connecting the fork members of the lever and the cam a distance from the pivot fastening.

4. In a machine of the character described, the combination of a frame, an arm fitted to the frame and having a working end, a block adapted to coöperate with the working end of the arm, a spacing gage formed of a spring strip and having an end portion formed with a longitudinal slot and its opposite end offset to approach the working end of the arm, a set screw adapted to operate in the longitudinal slot of the spacing gage for securing the same to the frame in an adjusted position, and a set screw mounted upon the spacing gage and adapted to engage the frame to move the offset end of the gage laterally.

In testimony whereof I affix my signature in presence of two witnesses.

EBENEZER J. MOORE.

Witnesses:
C. E. MORSE,
F. S. VAILL.